(12) United States Patent
Cai et al.

(10) Patent No.: US 8,700,034 B2
(45) Date of Patent: Apr. 15, 2014

(54) QUERYING A SUBSCRIBER SERVER FOR IDENTITIES OF MULTIPLE SERVING ELEMENTS OF USER EQUIPMENT (UE)

(75) Inventors: Yigang Cai, Naperville, IL (US); Suzann Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 579 days.

(21) Appl. No.: 12/862,608

(22) Filed: Aug. 24, 2010

(65) Prior Publication Data
US 2012/0052859 A1  Mar. 1, 2012

(51) Int. Cl.
*H04W 8/04* (2009.01)
(52) U.S. Cl.
CPC ....................... *H04W 8/04* (2013.01)
USPC ........... 455/433; 370/328; 370/401; 370/352; 455/435.1
(58) Field of Classification Search
CPC .................. H04L 29/12188; H04L 29/06312; H04L 29/08936; H04L 61/1588; H04W 8/04; H04W 92/02
USPC ................ 455/433, 435.1; 370/328, 401, 352
See application file for complete search history.

(56) References Cited

U.S. PATENT DOCUMENTS

| | | | |
|---|---|---|---|
| 7,583,655 B2 * | 9/2009 | Hua et al. | 370/350 |
| 7,920,529 B1 * | 4/2011 | Mahler et al. | 370/338 |
| 8,165,063 B2 * | 4/2012 | Kim et al. | 370/328 |
| 2006/0084431 A1 * | 4/2006 | Hua et al. | 455/433 |
| 2006/0276193 A1 * | 12/2006 | Itzkovitz et al. | 455/445 |
| 2008/0130624 A1 * | 6/2008 | Hua et al. | 370/350 |
| 2009/0268702 A1 * | 10/2009 | Hua et al. | 370/338 |
| 2010/0208725 A1 * | 8/2010 | Lahtinen et al. | 370/352 |
| 2011/0151865 A1 * | 6/2011 | Lau et al. | 455/433 |

FOREIGN PATENT DOCUMENTS

EP        1648190        4/2006

OTHER PUBLICATIONS

"3rd Generation Partnership Project; Digital Cellular Telecommunications Systems (Phase 2+); Definition of Diameter-based Lh interface for Control Plane LCS"; 3GPP TS 29.173 v9.0.0 Release 9 (Apr. 2010).*

3rd Generation Partnership Project; Technical Specification Group Core Network and Terminals; IP Multimedia Subsystem Sh Interface; Signaling flows and message contents; 3GPP TS 29.328 v8.5.0 (Jun. 2009).*

"3rd Generation Partnership Project; Technical Specification Group Core Network and Terminals; IP Multimedia (IM) Subsystem Sh interface; Signalling flows and message contents (Release 9)"; 650 Route des Lucioles—Sophia Antipolis Valbonne—France; 3GPP TS 29.328 V9.2.0 (Jun. 2010); all pages.

* cited by examiner

*Primary Examiner* — Kibrom T Hailu
*Assistant Examiner* — Benjamin Lamont
(74) *Attorney, Agent, or Firm* — Duft Bornsen & Fettig, LLP

(57) ABSTRACT

Systems and methods are disclosed that provide identities of multiple serving elements of user equipment (UE). In one embodiment, a subscriber server of a packet-switched data network stores data for the UE, which is served by the packet-switched data network. The subscriber server receives a user data request from a network element over a Diameter interface. In response to the user data request, the subscriber server identifies multiple serving elements where the UE is presently registered in the packet-switched data network and/or a legacy network. The subscriber server inserts identifiers for the multiple serving elements where the UE is presently registered in a user data answer, and transmits the user data answer to the network element over the Diameter interface.

18 Claims, 4 Drawing Sheets

QUERYING A SUBSCRIBER SERVER FOR IDENTITIES OF MULTIPLE SERVING ELEMENTS OF USER EQUIPMENT (UE)

FIELD OF THE INVENTION

The invention is related to the field of communication systems and, in particular, to providing a service that allows a network element to query a subscriber server (e.g., HSS) for identities of multiple serving elements of user equipment (UE).

BACKGROUND

Wireless phone providers are developing dual mode phones that have the functionality to communicate with a cellular network and another type of wireless data network. The cellular network is generally a 2G or 3G network that includes a circuit-switched core network (e.g., UMTS or cdma2000) for voice communications, and may also include a packet-switched core network (e.g., GPRS) for data communications. The wireless data network is generally a 3G or 4G data-only or data-optimized network typically used for data communications, such as Internet browsing, email, Voice over IP (VoIP), online gaming, etc. The concept of the dual mode phone is to allow a user the flexibility to communicate with either the cellular network or the wireless data network.

When a dual mode phone is in range of the cellular network, the dual mode phone registers with the cellular network to receive communication access. Network elements in the cellular network may then serve the dual mode phone to provide service. For example, a Mobile Switching Center (MSC) or a Serving GPRS Support Node (SGSN) may serve a dual mode phone while it is registered with the cellular network, and act as serving elements for the phone.

In addition to cellular networks, dual mode phones may come into range of local wireless "hot spots" in a corporation or enterprise, airports, book stores, coffee shops, etc. The wireless hot spot may be in a building where cellular service is unavailable or may overlap a cellular service area. When a dual mode phone is in range of a wireless hot spot, the dual mode phone registers with a packet-switched core network via the Wireless LAN (WLAN) to receive communication access. Some examples of a packet-switched core networks are an IP Multimedia Subsystem (IMS) network and a Long Term Evolution/Evolved Packet Core (LTE/EPC) network. Network elements in the packet-switched core network may then serve the dual mode phone to provide services. For example, a Mobility Management Entity (MME) and a Packet Data Network Gateway (PDN-GW) may serve a dual mode phone while it is registered with the packet-switched core network, and act as serving elements for the phone.

The packet-switched core network includes a subscriber server, such as a Home Subscriber Server (HSS), that is a master database for storing subscriber profiles, performing authentication and authorization of the user, and providing information about the physical location of the user. The packet-switched core network may also include or communicate with application servers (AS), which are configured to provide particular services for the dual mode phone. The application servers communicate with the HSS over a Diameter Sh interface to extract the necessary service data to dispatch the logic of a service.

SUMMARY

Embodiments described herein provide a generic service within a subscriber server where a network element (e.g., an application server) is able to query the subscriber server over a Diameter interface requesting registered serving elements of User Equipment (UE), and the subscriber server provides identifiers for multiple serving elements where the UE is presently registered. The serving elements may be in a packet-switched data network (e.g., LTE or IMS) or in a legacy network (e.g., UMTS). For example, a network element (e.g., an application server) may send a Diameter Sh User-Data-Request to the subscriber server, such as an HSS, requesting the UE's registered server IDs. In response to the request, the subscriber server identifies multiple serving elements where a UE is presently registered. For example, the UE may be registered with an S-CSCF in an IMS network, an MSC and an SGSN in a UMTS network, and a Mobility Management Entity (MME) of an LTE network. The subscriber server described herein is able to collect the ID's of each of these serving elements where the UE is presently registered, and provide the identities to the requesting network element over the Diameter interface, such as in a Diameter Sh User-Data-Answer.

Previously, if a network element were to query the subscriber server requesting a UE's registered server ID, the subscriber server responded only with the ID of the S-CSCF in the IMS network (assuming that the UE was presently registered with the S-CSCF). The subscriber server was not configured to identify other serving elements where the UE is presently registered, and the Diameter interface did not allow for the subscriber server to provide other identifiers other than the S-CSCF ID. According to the embodiments described herein, the subscriber server is able to identify multiple serving elements where a UE is presently registered (instead of just the S-CSCF ID), and provide IDs for the multiple serving elements to the requesting network element. Additionally, the Diameter interface has been enhanced so that the IDs for the multiple serving elements may be sent from the subscriber server to the requesting network element. One advantage of the service summarized above is that the network element can identify where a UE is located with a single query to the subscriber server. Thus, the network element may provide seamless service to the UE while the UE is moving between a packet-switched data network and a legacy network.

One embodiment comprises a subscriber server of a packet-switched data network. The subscriber server is operable to store data for user equipment (UE) served by the packet-switched data network. The subscriber server is further operable to receive a user data request from the network element over a Diameter interface, and to identify multiple serving elements where the UE is presently registered in the packet-switched data network and/or a legacy network in response to the user data request. The subscriber server is further operable to insert identifiers for the multiple serving elements where the UE is presently registered in a user data answer, and to transmit the user data answer to the network element over the Diameter interface.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
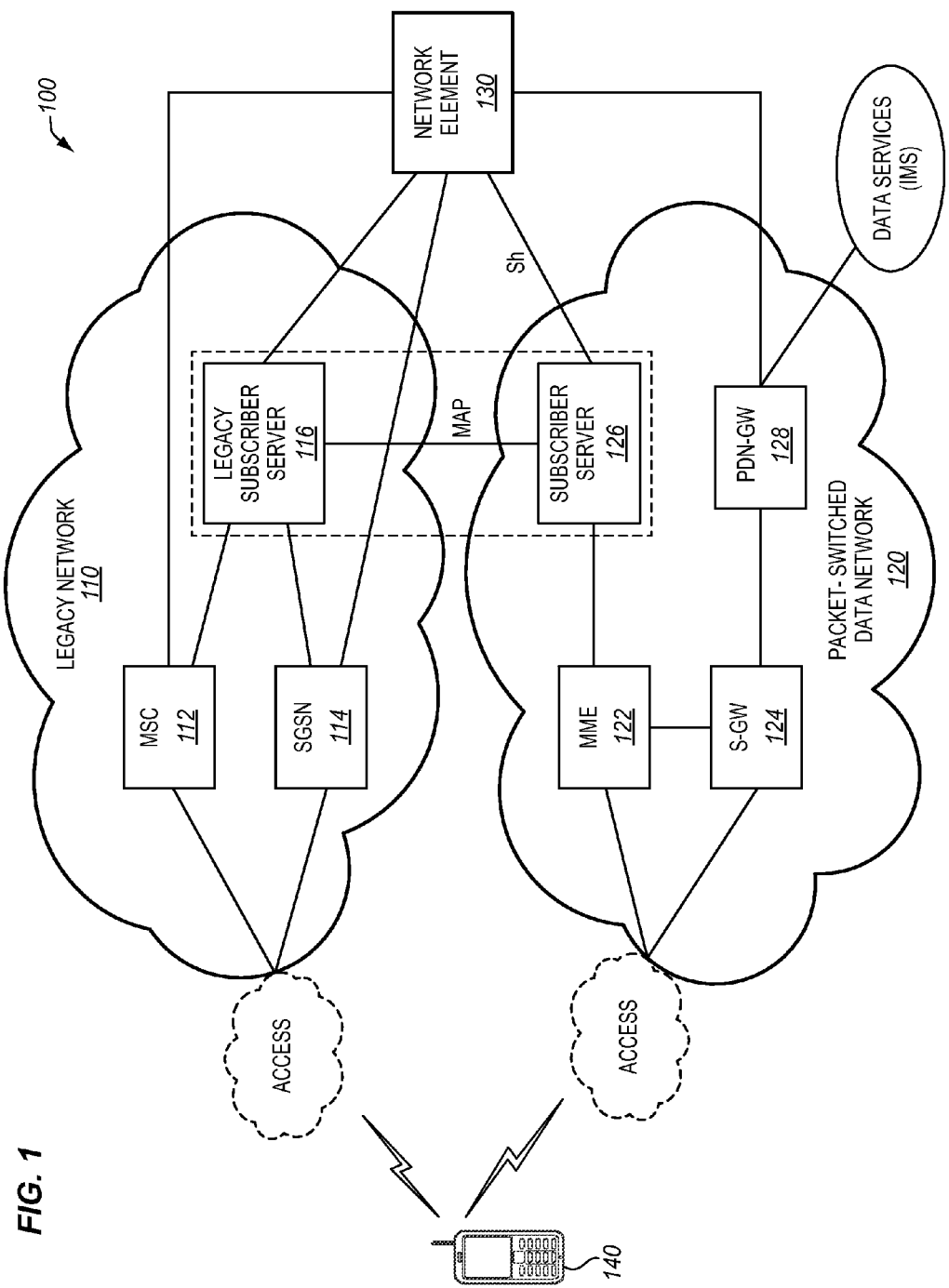
FIG. 1 illustrates a system in an exemplary embodiment.

FIG. 1 illustrates a system 100 in an exemplary embodiment. System 100 includes a legacy network 110 and a packet-switched data network 120. The network clouds illustrating the networks are not being used to show the actual service areas of the networks, as the service areas may be separate or overlap. Legacy network 110 and packet-switched data network 120 are separate networks, but both networks 110 and 120 may be managed or owned by a common service provider.

Legacy network 110 and packet-switched data network 120 are both adapted to provide communication services to user equipment (UE) 140. UE 140 comprises a terminal or device operable to communicate with both packet-switched data network 120 and legacy network 110. Thus, UE 140 may be referred to as a dual mode device. UE 140 may be a wireless device, a wireline device, or a combination of the two.

Legacy network 110 comprises any 2G or 3G (3GPP and 3GPP2) network that is not an IMS, an LTE network, or another type of data-only or data-optimized network that is packet-switched. Examples of legacy network 110 include a 2G CDMA network, a 3G GSM network, a UMTS network, etc. "Legacy" is not intended to refer to only networks presently existing, but also to 2G or 3G networks that may be developed in the future. Legacy network 110 includes, as an example, a Mobile Switching Center (MSC) 112, a Serving GPRS Support Node (SGSN) 114, and a legacy subscriber server 116. Legacy subscriber server 116 comprises any database or server operable to store information on subscribers to legacy network 110. One example of legacy subscriber server 116 is a Home Location Register (HLR). Legacy subscriber server 116 may store a subscriber profile for the end user of UE 140, along with profiles for other end users of legacy network 110.

Packet-switched data network 120 includes, as an example, a Mobility Management Entity (MME) 122, a serving gateway (S-GW) 124, a subscriber server 126, and a Packet Data Network Gateway (PDN-GW) 128. These elements in FIG. 1 are indicative an LTE/EPC network, but packet-switched data network 120 may include elements from other types of packet-switched networks. Subscriber server 126 comprises any database or server operable to store information on subscribers of packet-switched data network 120. One example of subscriber server 126 is a Home Subscriber Server (HSS). Subscriber server 126 may store a subscriber profile for the end user of UE 140, along with profiles for other end users of packet-switched data network 120. Subscriber server 126 may be independent from legacy subscriber server 116 as shown in FIG. 1. In such a scenario, subscriber server 126 may connect to legacy subscriber server 116 over a MAP interface or another type of interface. In another scenario, legacy subscriber server 116 and subscriber server 126 may comprise a consolidated or shared subscriber server, such as a combined HLR/HSS. This is illustrated as a dotted box in FIG. 1. If legacy subscriber server 116 and subscriber server 126 comprise a consolidated server, there is no need for a MAP interface between the servers.

One portion of packet-switched data network 120 is referred to as "data services". The data services referred to herein may be provided through an IP Multimedia Subsystem (IMS). Those skilled in the art will appreciate that an IMS network includes a serving-call session control function (S-CSCF), an interrogate-CSCF (I-CSCF), one or more application servers, one or more gateways, etc, although not specifically shown in the FIG. 1.

When in operation, if UE 140 comes into range of the access network of legacy network 110, then UE 140 registers with legacy network 110. For example, UE 140 may register with MSC 112, SGSN 114, etc. The registration of UE 140 in legacy network 110 may be stored in legacy subscriber server 116, such as in a subscriber profile. Similarly, if UE 140 is in range of an access network of packet-switched data network 120, then UE 140 registers with packet-switched data network 120. For example, UE 140 may register with MME 122, PDN-GW 128, an S-CSCF in the IMS network, etc. The registration of UE 140 in packet-switched data network 120 may be stored in subscriber server 126, such as in a subscriber profile.

According to embodiments described herein, subscriber server 126 is able to provide the generic service that notifies a network element 130 of multiple serving elements where UE 140 is presently registered. Network element 130 comprises any application server or other server operable to provide a service or call feature for UE 140. Examples of network element 130 include an application server, a Short Message Service Center (SMSC), a Multimedia Message Service Center (MMSC), etc. If network element 130 sends a request for user data to subscriber server 126, subscriber server 126 determines multiple serving elements where UE 140 is presently registered in legacy network 110 and/or packet-switched data network 120, and sends IDs for the serving elements to the requesting network element 130. The requesting network element 130 is therefore notified of each element that is serving UE 140 in order to provide the best possible service to the UE 140.

Figure 2:
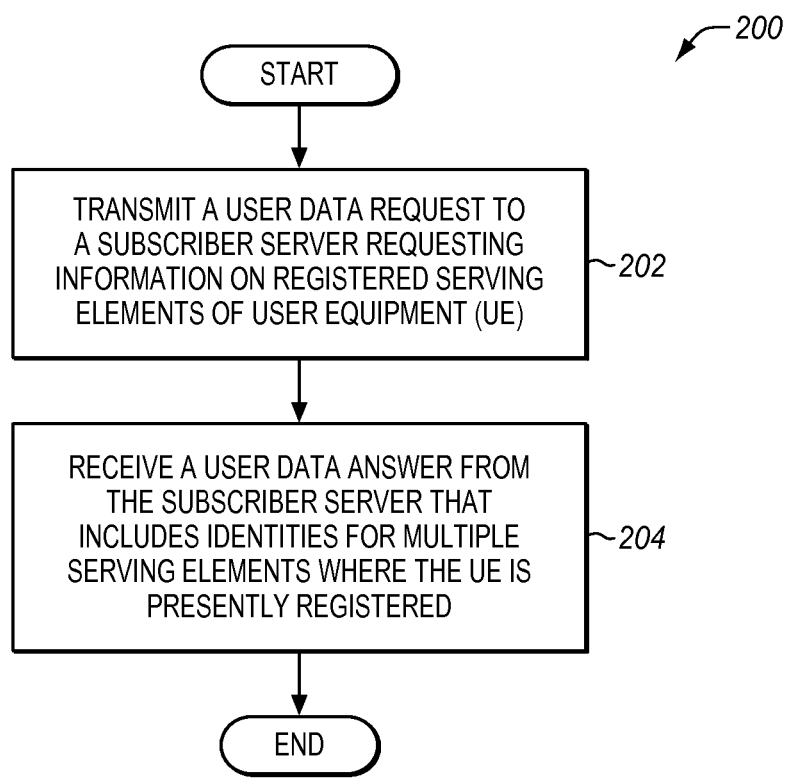
FIG. 2 is a flow chart illustrating a method of requesting user data in an exemplary embodiment.

FIG. 2 is a flow chart illustrating a method 200 of requesting user data in an exemplary embodiment. The steps of method 200 will be described with reference to system 100 in FIG. 1, but those skilled in the art will appreciate that method 200 may be performed in other networks and systems. The steps of the flow charts described herein are not all inclusive and may include other steps not shown. The steps may also be performed in an alternative order.

Assume that network element 130 has been requested to provide a service to UE 140. For example, network element 130 may receive an SMS message that is addressed to UE 140 and is tasked with delivering the SMS message to UE 140. In order to provide the service, network element 130 may access subscriber database 126 to acquire data for UE 140. Thus, network element 130 transmits a user data request for UE 140 to subscriber server 126 over the Diameter interface in step 202 requesting information on registered serving elements for UE 140. A registered serving element is a serving element in packet-switched data network 120 and/or legacy network 110 where UE 140 is presently registered. The process flow then continues to FIG. 3.

Figure 3:
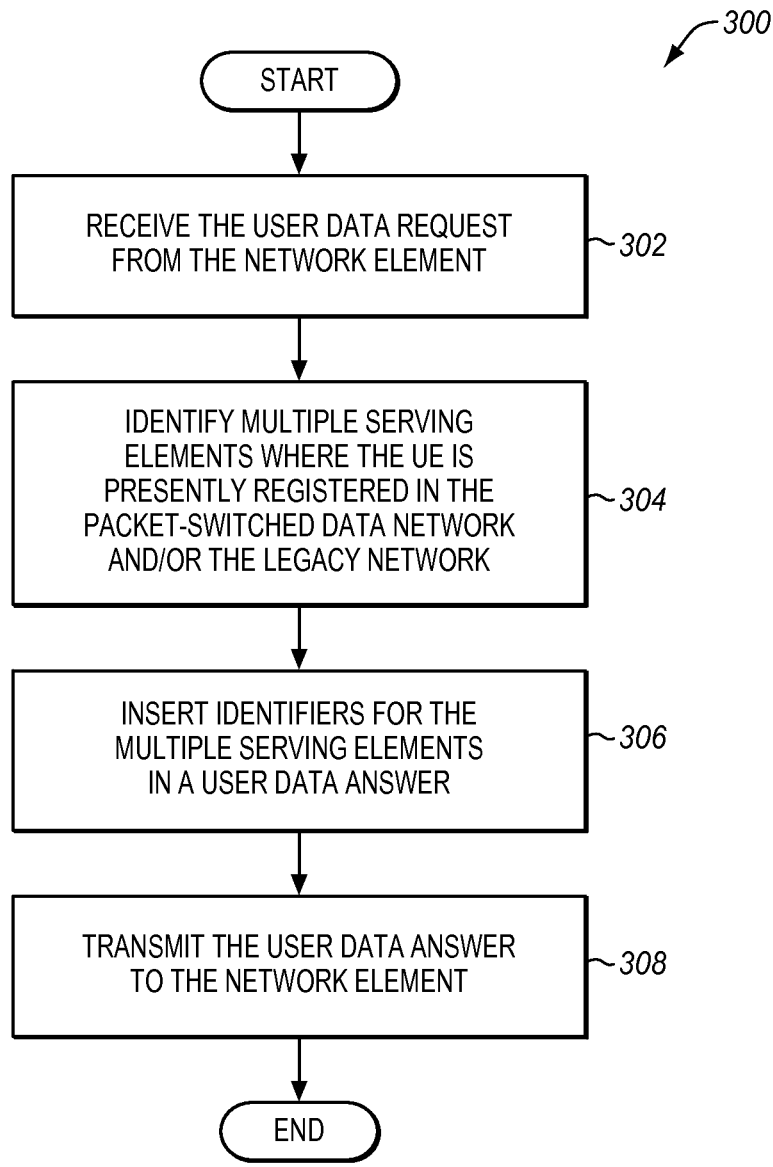
FIG. 3 is a flow chart illustrating a method of notifying a requesting network element where a UE is presently registered in an exemplary embodiment.

FIG. 3 is a flow chart illustrating a method 300 of notifying a requesting network element 130 where a UE 140 is presently registered in an exemplary embodiment. The steps of method 300 will be described with reference to system 100 in FIG. 1, but those skilled in the art will appreciate that method 300 may be performed in other networks and systems.

In step 302, subscriber server 126 receives the user data request from network element 130. The user data request is received over the Diameter interface, such as the Diameter Sh interface. Thus, the user data request may comprise a Diameter Sh User-Data-Request. In order to support the generic service, a new data reference for the Diameter Sh interface (see 3GPP TS 29.328) may be defined along with a new data reference value(s) which requests information on registered serving elements of a UE. Also, a new XML tag may be defined for the new data reference, which may be referred to as "GenericRegisteredServerID" in one embodiment. The operation allowed for this new data reference may be Sh-Pull, and the access key may be defined as desired. Still further, the Diameter Sh data UML model (see 3GPP TS 29.328 C.1) is enhanced with an optional item for "OtherRegisteredServer" that can have an MSC ID, a SGSN ID, an MME ID, and a PDN-GW ID among other IDs. The XML schema in 3GPP TS 29.328 Annex D is also enhanced to add elements for the MSC ID, the SGSN ID, the MME ID, the PDN-GW ID among other IDs.

In response to the user data request, subscriber server 126 identifies multiple serving elements where UE 140 is presently registered in one or both of packet-switched data network 120 and legacy network 110 in step 304. Subscriber server 126 stores a subscriber profile for UE 140, so subscriber server 126 may determine the serving elements in packet-switched data network 120 where UE 140 is presently registered by looking at the subscriber profile. For example, if UE 140 is registered with an S-CSCF in the IMS network, then this will be indicated in the subscriber profile. If UE 140 is registered with MME 122 or PDN-GW 128, then this will also be indicated in the subscriber profile.

Figure 4:
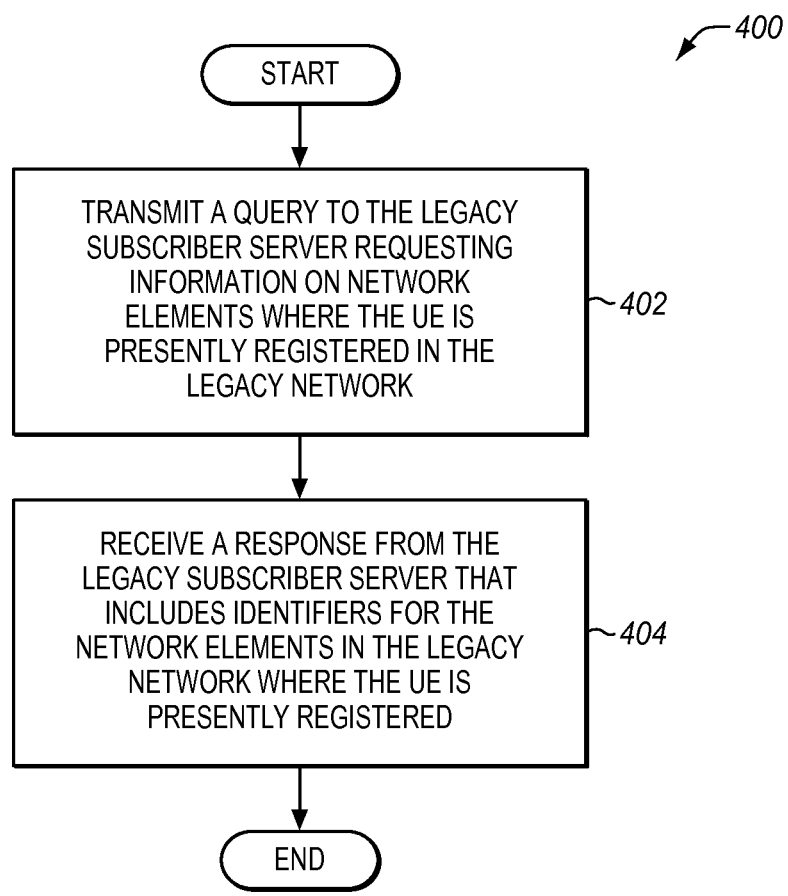
FIG. 4 is a flow chart illustrating a method of querying a legacy subscriber server in an exemplary embodiment.

In addition to identifying serving elements in packet-switched data network 120, subscriber server 126 is also able to identify serving elements in legacy network 116. To do so, subscriber server 126 may query legacy subscriber server 116 (assuming they are independent elements). Legacy subscriber server 116 stores a subscriber profile for UE 140, so subscriber server 126 may determine the serving elements in legacy network 110 where UE 140 is presently registered by looking at the subscriber profile stored in legacy network 110 (or portions of the subscriber profile). Thus, if UE 140 is registered with MSC 112 or SGSN 114 in legacy network 110, then subscriber server 126 is able identify this by querying legacy subscriber server 116. One example of querying legacy subscriber server 116 is shown in FIG. 4 and is discussed later.

In step 306, subscriber server 126 inserts identifiers for the multiple serving elements where UE 140 is presently registered in a user data answer. The user data answer may comprise a Diameter Sh User-Data-Answer. In order to support the generic service, new or enhanced Attribute Value Pairs (AVP) are defined in the Diameter interface for the identifiers of the multiple serving elements. For example, new AVPs may be defined for a Mobile Switching Center (MSC) identifier, a Serving GPRS Support Node (SGSN) identifier, a Mobility Management Entity (MME) identifier, and a Packet Data Network Gateway (PDN-GW) identifier. With the enhancement, the user data answer (e.g., Diameter Sh User-Data-Answer) supports identifiers for multiple serving elements where the UE is presently registered.

In step 308, subscriber server 126 transmits the user data answer to network element 130 over the Diameter interface. The message flow then returns back to FIG. 2. In step 204 of FIG. 2, subscriber server 126 receives the user data response from subscriber server 126. Because the user data answer includes IDs for multiple serving elements where UE 140 is presently registered, network element 130 is able to identify multiple paths for communicating with UE 140. For example, if the user data answer includes a MSC ID, then network element 130 may provide a service to UE 140 through MSC 112 of legacy network 110. If the user data answer includes an SGSN ID, then network element 130 may provide a service to UE 140 through SGSN 114 of legacy network 110. Thus, with a single query to subscriber server 126, network element 130 is able to identify each serving element where UE 140 is presently registered. Network element 130 may then provide seamless service to UE 140 even as UE 140 roams between packet-switched data network 120 and legacy network 110.

If subscriber server 126 and legacy subscriber server 116 are independent elements, then subscriber server 126 may query legacy subscriber server 116 as described above to determine if UE 140 is presently registered with any serving elements in legacy network 110. FIG. 4 is a flow chart illustrating a method 400 of querying legacy subscriber server 116 in an exemplary embodiment. The steps of method 400 will be described with reference to system 100 in FIG. 1, but those skilled in the art will appreciate that method 400 may be performed in other networks and systems.

In step 402, subscriber server 126 transmits a query to legacy subscriber server 116 requesting information on serving elements in legacy network 110 where UE 140 is presently registered. The interface between subscriber server 126 and legacy subscriber server 116 may comprise a Mobile Application Part (MAP) interface. In response to the query, legacy subscriber server 116 determines which (if any) serving elements in legacy network 110 have UE 140 indicated as presently registered. To do so, legacy subscriber server 116 may access a subscriber profile for UE 140 to determine which (if any) serving elements in legacy network 110 have UE 140 indicated as presently registered. Legacy subscriber server 116 may alternatively query individual serving elements in legacy network 110 or query some other database to determine which serving elements in legacy network 110 have UE 140 presently registered.

In step 404, subscriber server 126 receives a response to the query from legacy subscriber server 116 that includes identifiers for the serving elements in legacy network 110 where UE 140 is presently registered. In order to allow subscriber server 126 to receive the IDs for the serving elements in legacy network 110, new parameters are defined in the MAP interface for a Mobility Management Entity (MME) identifier, a Packet Data Network Gateway (PDN-GW) identifier, and possibly other identifiers. In one example, the response received by subscriber server 126 may comprises a MAP Send-Routing-Info-For-LCS response that includes the new parameters for the MME ID and the PDN-GW ID. The response may be a MAP Send-Routing-Info-For-LCS response when, for example, subscriber server 126 queries a GSM/UMTS 3G/4G HLR. In another example, the response received by subscriber server 126 may comprises a MAP LPReq response that includes a new parameter for the MSC ID. The response may be a MAP LPReq response when, for example, subscriber server 126 queries an ANSI 3G HLR.

There may be additional new parameters defined for other identifiers of other serving elements.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
   a Home Subscriber Server (HSS) operable to store data for an end user of user equipment (UE);
   the HSS is connected to an application server (AS) over a Diameter Sh interface;
   the HSS is further operable to receive a single user data request from the AS over the Diameter Sh interface, to identify multiple serving elements where the UE is presently registered in a packet-switched data network and a legacy network in response to the single user data request, to insert identifiers for the multiple serving elements in the packet-switched data network and the legacy network in a user data answer in response to the single user data request, and to transmit the user data answer to the AS over the Diameter Sh interface.

2. The system of claim 1 wherein:
   the user data request comprises a Diameter Sh User-Data-Request having a data reference set to a new value which requests information on registered serving elements of the UE.

3. The system of claim 2 wherein:
   the user data answer comprises a Diameter Sh User-Data-Answer having enhanced Attribute Value Pairs (AVP) for the identifiers for the multiple serving elements.

4. The system of claim 1 wherein the identifiers for the multiple serving elements comprise at least one of a Mobile Switching Center (MSC) identifier, a Serving GPRS Support Node (SGSN) identifier, a Mobility Management Entity (MME) identifier, and a Packet Data Network Gateway (PDN-GW) identifier.

5. The system of claim 1 wherein:
   the HSS is further operable to transmit a query to a Home Location Register (HLR) in the legacy network requesting information on serving elements in the legacy network where the UE is presently registered, and to receive a response to the query from the HLR that includes identifiers for the serving elements in the legacy network where the UE is presently registered.

6. The system of claim 5 wherein:
   an interface between the HSS and the HLR comprises a Mobile Application Part (MAP) interface; and
   new parameters are defined in the MAP interface for at least a Mobility Management Entity (MME) identifier and a Packet Data Network Gateway (PDN-GW) identifier.

7. The system of claim 6 wherein the response comprises a MAP Send-Routing-Info-For-LCS response that includes the new parameters for at least the MME identifier and the PDN-GW identifier.

8. A method comprising:
   storing data for an end user of user equipment (UE) in a Home Subscriber Server (HSS);
   receiving a single user data request in the HSS from an application server (AS) over a Diameter Sh interface;
   identifying multiple serving elements in the HSS where the UE is presently registered in a packet-switched data network and a legacy network in response to the single user data request;
   inserting identifiers for the multiple serving elements in the packet-switched data network and the legacy network in a user data answer in response to the single user data request; and
   transmitting the user data answer from the HSS to the AS over the Diameter Sh interface.

9. The method of claim 8 wherein:
   the user data request comprises a Diameter Sh User-Data-Request having a data reference set to a new value which requests information on registered serving elements of the UE.

10. The method of claim 9 wherein:
    the user data answer comprises a Diameter Sh User-Data-Answer having enhanced Attribute Value Pairs (AVP) for the identifiers for the multiple serving elements.

11. The method of claim 8 wherein the identifiers for the multiple serving elements comprise at least one of a Mobile Switching Center (MSC) identifier, a Serving GPRS Support Node (SGSN) identifier, a Mobility Management Entity (MME) identifier, and a Packet Data Network Gateway (PDN-GW) identifier.

12. The method of claim 8 wherein identifying multiple serving elements where the UE is presently registered in the legacy network comprises:
    transmitting a query from the HSS to a Home Location Register (HLR) in the legacy network requesting information on serving elements in the legacy network where the UE is presently registered; and
    receiving a response to the query in the HSS from the HLR that includes identifiers for the serving elements in the legacy network where the UE is presently registered.

13. The method of claim 12 wherein:
    an interface between the HSS and the HLR comprises a Mobile Application Part (MAP) interface; and
    new parameters are defined in the MAP interface for at least a Mobility Management Entity (MME) identifier and a Packet Data Network Gateway (PDN-GW) identifier.

14. The method of claim 13 wherein the response comprises a MAP Send-Routing-Info-For-LCS response that includes the new parameters for at least the MME identifier and the PDN-GW identifier.

15. A system comprising:
an Application Server (AS) operable to provide a service to User Equipment (UE);
the AS is connected to a Home Subscriber Server (HSS) of a packet-switched data network over a Diameter Sh interface;
the AS is further operable to transmit a single user data request to the HSS over the Diameter Sh interface requesting information on registered serving elements of the UE in the packet-switched data network and a legacy network, and to receive a user data response to the single user data request from the HSS over the Diameter Sh interface that includes identifiers for multiple serving elements where the UE is presently registered in the packet-switched data network and the legacy network.

16. The system of claim 15 wherein:
the user data request comprises a Diameter Sh User-Data-Request having a data reference set to a new value which requests information on the multiple serving elements where the UE is presently registered.

17. The system of claim 16 wherein:
the user data answer comprises a Diameter Sh User-Data-Answer having enhanced Attribute Value Pairs (AVP) for the identifiers for the multiple serving elements.

18. The system of claim 15 wherein the identifiers for the multiple serving elements comprise at least one of a Mobile Switching Center (MSC) identifier, a Serving GPRS Support Node (SGSN) identifier, a Mobility Management Entity (MME) identifier, and a Packet Data Network Gateway (PDN-GW) identifier.

* * * * *